United States Patent [19]
Zaug

[11] Patent Number: 5,195,634
[45] Date of Patent: Mar. 23, 1993

[54] REMOTE CONTROL HOLDER

[76] Inventor: Gregory P. Zaug, 707 E. 7th St., Hinsdale, Ill. 60521

[21] Appl. No.: 745,684

[22] Filed: Aug. 16, 1991

[51] Int. Cl.⁵ .............................................. B65D 25/10
[52] U.S. Cl. .................................. 206/320; 206/328; 206/472; 248/309.1
[58] Field of Search ............... 206/305, 320, 328, 387, 206/472, 473; 248/309.1, 316.1, 310

[56] References Cited

U.S. PATENT DOCUMENTS

| | | | |
|---|---|---|---|
| D. 300,432 | 3/1989 | Zuehsow | D14/218 |
| D. 310,367 | 9/1990 | Dockery | D14/217 |
| 1,297,435 | 3/1919 | Beck | 248/310 |
| 2,151,192 | 3/1939 | Crosser | 248/310 |
| 3,170,206 | 2/1965 | Triplett | 248/298 |
| 4,496,048 | 1/1985 | Sykes | 206/387 |
| 4,611,714 | 9/1986 | Behrens | 206/387 |
| 4,733,776 | 3/1988 | Ward | 206/305 |
| 4,735,377 | 4/1988 | Zuehsow | 242/107 |
| 4,739,897 | 4/1988 | Butler | 220/22 |
| 4,771,886 | 9/1988 | Johnson | 206/472 |
| 4,815,683 | 3/1989 | Ferrante | 248/205.2 |
| 4,838,505 | 6/1989 | Lowe | 248/176 |
| 4,848,609 | 7/1989 | Meghnot | 211/13 |
| 4,852,746 | 8/1989 | Wells et al. | 211/13 |
| 4,856,658 | 8/1989 | Novak | 211/13 |
| 4,925,149 | 5/1990 | DiFrancesca et al. | 248/687 |
| 5,082,220 | 1/1992 | Pollock et al. | 248/693 |

FOREIGN PATENT DOCUMENTS 0650675 1/1929 France .................. 248/274

Primary Examiner—Jimmy G. Foster
Attorney, Agent, or Firm—Marshall, O'Toole, Gerstein, Murray & Bicknell

[57] ABSTRACT

The present invention relates to a holder which makes it more difficult to misplace remote control units. The holder according to the present invention includes an enclosure having a compartment for holding a remote control unit therein when the remote control unit is idle and a cover which may be opened so that the remote control unit may be removed from the compartment for use and may be returned to the compartment after use. An attaching mechanism connects the remote control unit to the enclosure so that the remote control unit cannot be separated from its holder. Since the enclosure is larger than the remote control unit, it is more difficult to misplace the enclosure containing the remote control unit than it is to misplace the remote control unit alone.

15 Claims, 1 Drawing Sheet

U.S. Patent    Mar. 23, 1993    5,195,634

REMOTE CONTROL HOLDER

FIELD OF THE INVENTION

The present invention generally relates to holders for articles, and more particularly to an apparatus for hindering misplacement of a remote actuating device such as a remote control used in connection with a television, video cassette player, stereo equipment, or the like.

BACKGROUND OF THE INVENTION

With the burgeoning use of electronic equipment such as televisions, video cassette recorders and players, stereo equipment and portable telephones, the number of remote control units, which permit control of such equipment from a remote location, has increased dramatically. These remote control units have greatly enhanced user convenience and pleasure. However, because such remote control units are typically small in size, there is a tendency for at least some users of such equipment to misplace their remote control units. When a remote control unit is lost or misplaced, the user no longer has the advantages provided by the remote control unit and suffers the further aggravation of having to find the unit.

SUMMARY OF THE INVENTION

The present invention relates to a holder which makes it more difficult to misplace remote control units. The holder, according to one aspect of the invention, includes an enclosure having a compartment for holding a remote control unit therein when the remote control unit is idle and a cover which may be opened so that the remote control unit may be removed from the compartment for use and may be returned to the compartment after use. An attaching mechanism attaches the remote control unit to the enclosure so that the remote control unit cannot be separated from its holder. Since the enclosure is larger than the remote control unit, it is more difficult to misplace the enclosure containing the remote control unit than it is to misplace the remote control unit itself.

According to another aspect of the invention, a holder for a wireless remote control unit includes a base member of sufficient size that the base member is less easily misplaced than the wireless remote control and an attaching means for attaching the wireless remote control unit to the base member.

The holder may be the type of container suitable for holding video tape cassettes.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
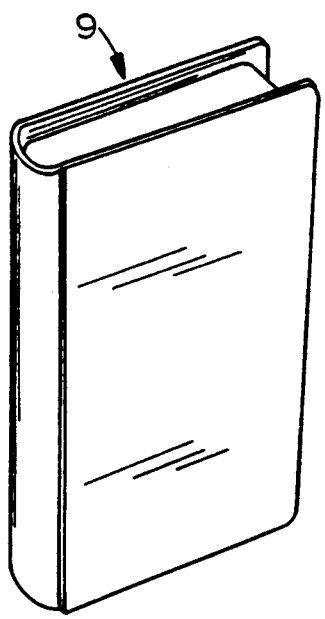
FIG. 1 illustrates a perspective view of the remote control holder according to the present invention.
Figure 2:
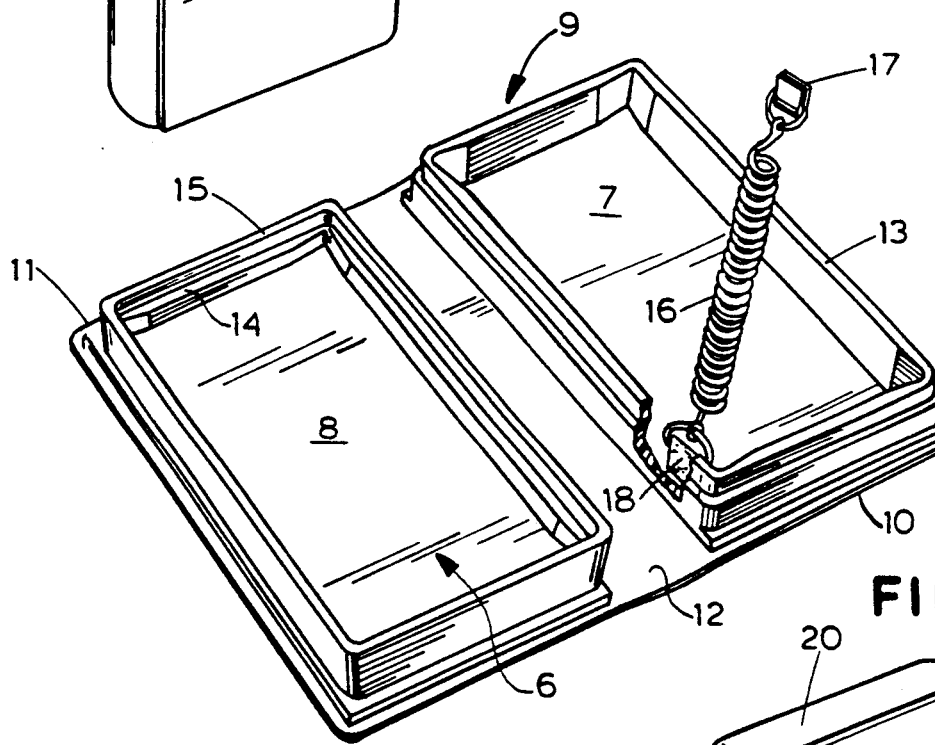
FIG. 2 shows an opened holder and attaching mechanism.

As shown in FIGS. 1 and 2, the remote control holder according to the present invention may comprise the book simulating holder typically used to contain video cassettes. Holder 9 includes an enclosure 6 defined by a first tray 10 and a second tray 11 joined by spine 12 which may be in the form of a flexible hinge. Tray 10 may have a flat bottom 7 surrounded by an upstanding peripheral wall 13. Similarly, tray 11 may have a flat bottom 8 surrounded by an upstanding peripheral wall 15. Upstanding peripheral wall 15 has a shoulder 14 formed integrally therewith along its inner periphery. When holder 9 is closed, peripheral wall 13 is press-fitted within upstanding wall 15 and abuts shoulder 14 to provide a snug fit in order to maintain holder 9 closed. When closed, upstanding walls 13 and 15 provide a compartment within which a remote control can be contained. Since holder 9 is substantially larger than the remote control contained therein, it is more difficult to misplace the holder 9 than it is the remote control unit.

Figure 4:
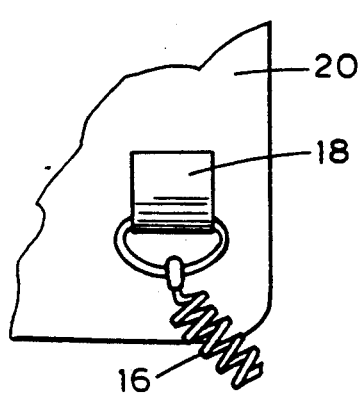
FIGS. 3 and 4 show the attaching mechanism of FIG. 2 attached to a remote control unit.
Figure 3:
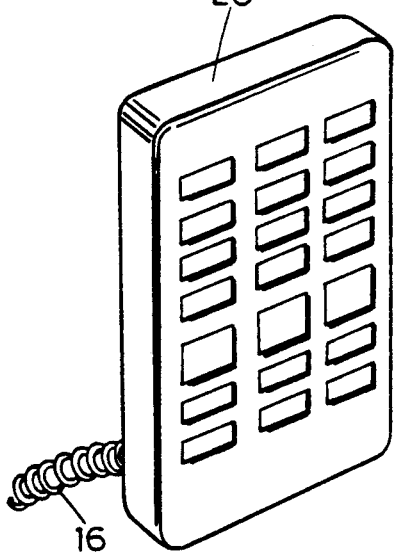

Suitably fastened to holder 9 is an attaching mechanism 16 which, in the preferred embodiment, comprises an elongate, stretchable coil-type cord having a coupling device 17 at one end thereof for coupling attachment mechanism 16 to the remote control unit 20 shown in FIGS. 3 and 4. Attaching mechanism 16 can be attached to either tray 10 or 11 but is shown conveniently attached to tray 10. Attaching mechanism 16 is attached to tray 10 by any suitable arrangement; for example, attaching mechanism 16 may have one end molded into tray 10 or may have an adhesive clip 18 clipped to one end of attaching mechanism 16 and adhesively attached to tray 10 but any suitable means of coupling attaching mechanism 16 to holder 9 may be used. Coupler 17 also may be an adhesive clip clipped to the other end of attaching mechanism 16 and adhesively attached to remote control unit 20. This arrangement allows remote control unit 20 to be used in positions away from holder 9 but remote control unit 20 cannot be separated therefrom. Coupler 17 can be any other suitable coupling device 17 for coupling attaching mechanism 16 to remote control unit 20. It is preferable that the coupling device 17 be such that remote control unit 20 cannot be removed from attaching mechanism 16 accidently.

When remote control unit 20 is attached by attaching mechanism 16 to holder 9, holder 9 can be opened and the remote control unit 20 removed therefrom for use in connection with electronic equipment. While remote control unit 20 is so being used, attaching mechanism 16 prevents it from being accidentally separated from holder 9. Thus, even though remote control unit 20 may be covered by magazines or may have slipped down between the cushions of a sofa or chair, it can easily be located by locating holder 9 and following attaching mechanism 16. When use of remote control unit 20 has ended, it can be returned to holder 9 and holder 9 can be closed for storage. Since holder 9 is significantly larger than remote control unit 20, it cannot be as easily misplaced.

If desired, the holder 9 may accommodate other devices, such as a portable telephone, wireless remote headphones or the like. Also, it should be noted that modifications may be made to the holder 9 without departing from the scope of the invention. For example, the holder 9 may be configured on the outside thereof to simulate a book cover, and/or may include means for fastening the holder 9 to a surface. In the latter case, the holder 9 may be permanently or semipermanently attached to the surface. Still further, the holder may include one or more items either removably or non-removably retained therein, such as a pencil and pad of paper, a clock, a pocket for retaining small items, or the like. In this case, these items may be retained therein by a slot or another fastening device such as a velcro strip or the like.

I claim:

1. A combination of a remote control device for remotely operating a controlled device and an apparatus for hindering the misplacement of the remote control device, said combination comprising:
    a base member of sufficient size that said base member is less easily misplaced than said remote control device; and,
    attaching means attaching said remote control device to said base member, said attaching means including a helical-type cord.

2. The apparatus of claim 1 wherein said attaching means comprises a first fastener means for adhesively fastening one end of said helical-type cord to said remote control device.

3. The apparatus of claim 2 wherein said attaching means comprises a fastening means for adhesively fastening said base member to said helical-type cord.

4. The apparatus of claim 3 wherein said base member comprises a video tape cassette-type holder having first and second trays joined by a hinge wherein said first and second trays form a compartment when said holder is closed, wherein said attaching means attaches said remote control device to one of said trays wherein said remote control device is adapted to be contained within said compartment when said remote control device is not in use.

5. An apparatus for impeding the misplacement of a remote control device comprising:
    a book-type holder having a tray joined to a cover wherein the cover and the tray form a compartment within which a remote control device can be enclosed, the tray having two pairs of opposing walls and a bottom defining a volume; and,
    attaching means for attaching said remote control device to said book-type holder, said attaching means including
    an elongated member having a first end attached by a coupler to said tray within said volume wherein said remote control device may be used remotely from said book-type holder when said remote control device is attached to said book-type holder, and
    coupling means for coupling a second end of said elongated member to said remote control device; wherein one of said coupler and said coupling means is an adhesive-type coupler.

6. The apparatus of claim 5 wherein said first coupling means comprises an adhesive coupling means for adhesively coupling said elongated member to said remote control device, and wherein said second coupling means comprises an adhesive coupling means for adhesively coupling a second end of said elongated member to said base member.

7. The apparatus of claim 6 wherein said elongated member comprise a helical-type cord.

8. The apparatus of claim 5 wherein said elongated member comprises a helical-type cord.

9. An apparatus for hindering misplacement of a wireless remote control device used to remotely control a controlled device which is not electrically connected to said wireless remote control device, said apparatus comprising:
    a base member of sufficient size that said base member is larger than said wireless remote control device and is less easily misplaced than said wireless remote control device, said base member being adapted to encase a wireless remote control device; and,
    attaching means coupled to said base member for attaching said wireless remote control device to said base member so that said wireless remote control device can be used remotely from said base member and so that said wireless remote control device is not electrically connected to the controlled device, said attaching means comprising a helical cord and a first fastening means for fastening one end of said helical cord to said remote control device.

10. The apparatus of claim 9 wherein said first fastening means comprises means for adhesively fastening one end of said helical-type cord to said remote control device.

11. The apparatus of claim 10 wherein said attaching means comprises a fastening means for adhesively fastening said base member to said cord.

12. The apparatus of claim 11 wherein said base member comprises a video tape cassette-type holder having first and second trays joined by a hinge wherein said first and second trays form a compartment adapted to hold said wireless remote control device when said holder is closed, wherein said attaching means attaches said remote control device to one of said trays whereby said remote control device may be contained within said compartment when said remote control device is not in use.

13. An apparatus for hindering misplacement of a wireless remote control device, said wireless remote control device being of the type which is used to control a controlled device, said apparatus comprising:
    a book-type holder having a tray and a cover wherein the cover and the tray form a compartment within which a remote control device can be enclosed, said tray having two pairs of opposing walls and a bottom defining a volume; and,
    a cord attached at one end of said tray within said volume, said cord adapted for attaching an opposite end thereof to said wireless remote control device so that said wireless remote control device can be used remotely from said book-type holder, wherein said wireless remote control device is not electrically connected to said controlled device.

14. The apparatus of claim 13 wherein said cord comprises a first fastening means for adhesively fastening one end of said cord to said remote control device.

15. The apparatus of claim 14 wherein said cord comprises a second fastening means for adhesively fastening said said cord to said tray within said volume.

* * * * *